United States Patent [19]
Sweet et al.

[11] 3,866,894
[45] Feb. 18, 1975

[54] AIR SPRING UNIT FOR SUSPENSION SYSTEMS

[75] Inventors: Phillip J. Sweet; Buck C. Hamlet; David L. Sweet, all of Fresno, Calif.

[73] Assignee: American Carrier Equipment, Fresno, Calif.

[22] Filed: Sept. 27, 1973

[21] Appl. No.: 401,241

[52] U.S. Cl. .............................. 267/31, 280/124 F
[51] Int. Cl. ........................................ F16f 11/34
[58] Field of Search .................. 267/31, 32, 18, 54; 280/124 F

[56] References Cited
UNITED STATES PATENTS

| | | |
|---|---|---|
| 2,902,275 | 9/1959 | Hammond et al. ................... 267/31 |
| 3,063,732 | 11/1962 | Harbers et al. .................. 280/124 F |
| 3,294,390 | 12/1966 | Warmkessel ......................... 267/31 |

*Primary Examiner*—James B. Marbert
*Attorney, Agent, or Firm*—Huebner & Worrel

[57] ABSTRACT

An air spring unit for a suspension system, characterized by a mounting bracket for mounting the unit in a suspended relationship with the frame of a highway vehicle, a force dissipating arm pivotally connected at its base end with the bracket and supported for oscillatory motion about a horizontal axis, an air bag interposed between the frame and the distal end of the force dissipating arm, and a force transfer plate interposed between the air bag and the axis and adapted to seat in a sliding relation with the distal end of a cantilevered leaf spring projected from the load-bearing axle of the vehicle.

1 Claim, 6 Drawing Figures

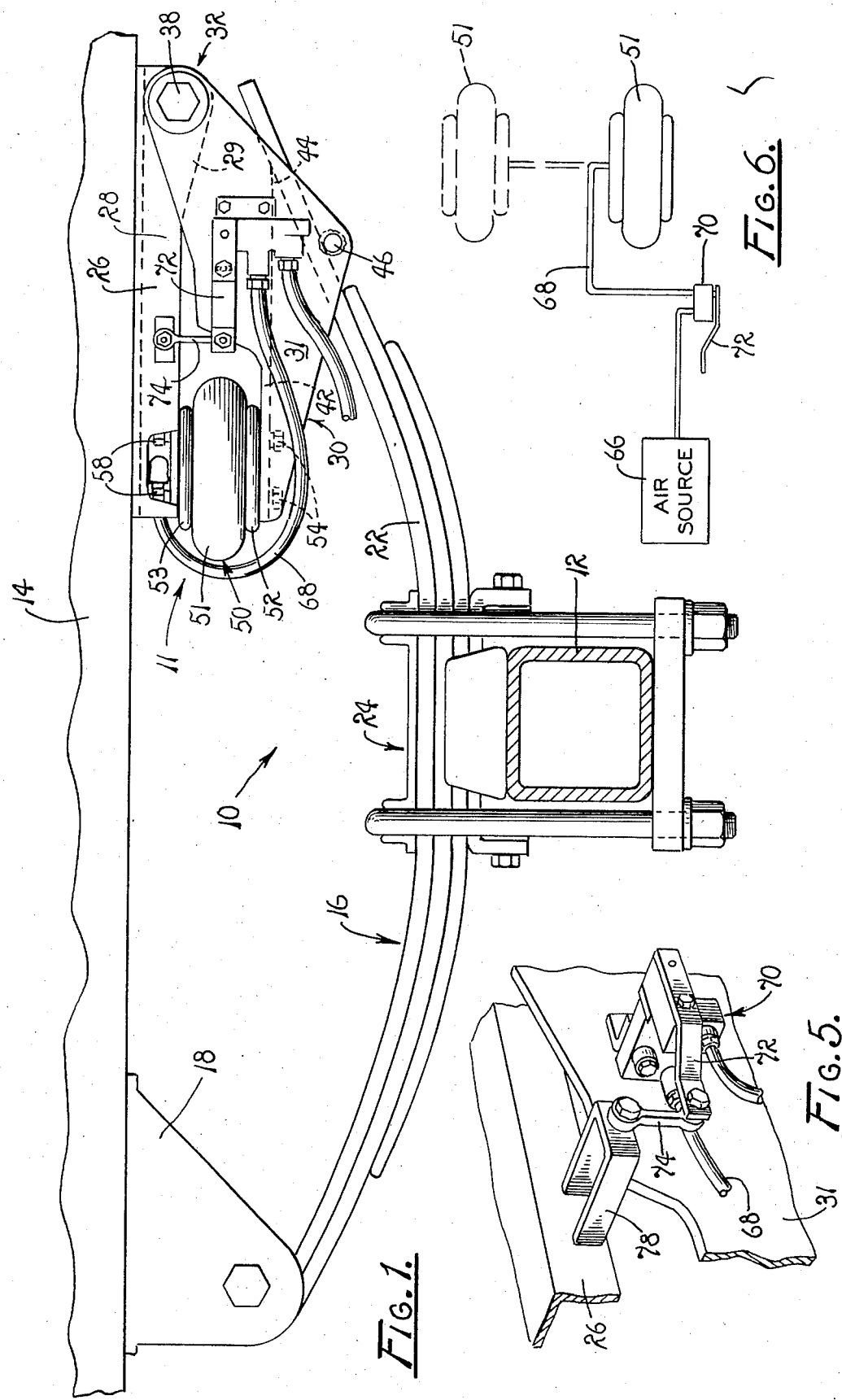

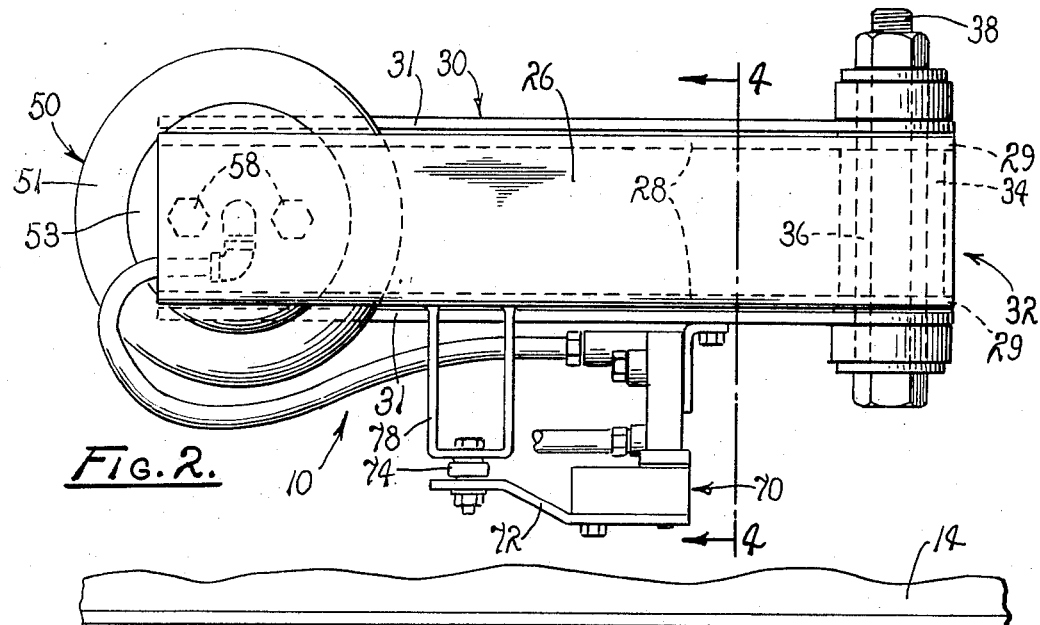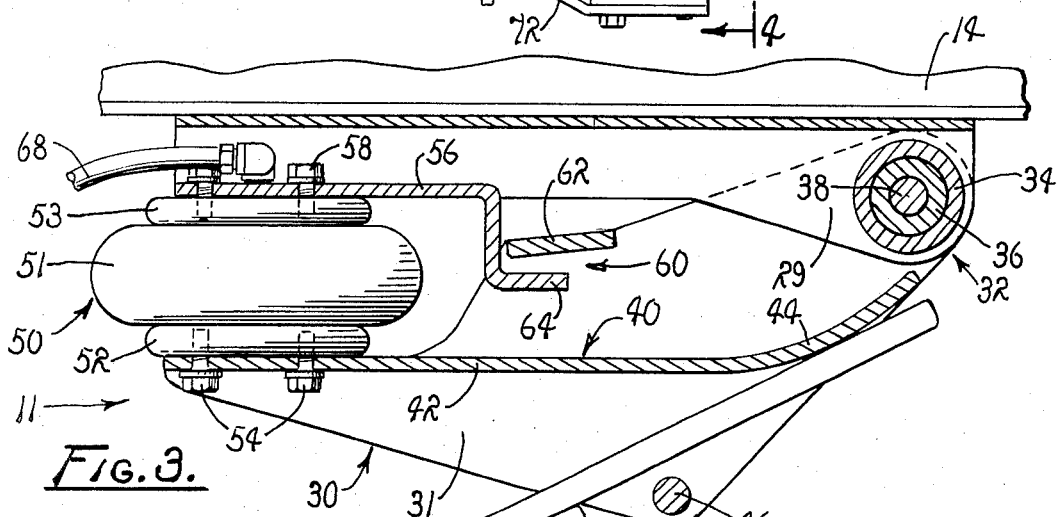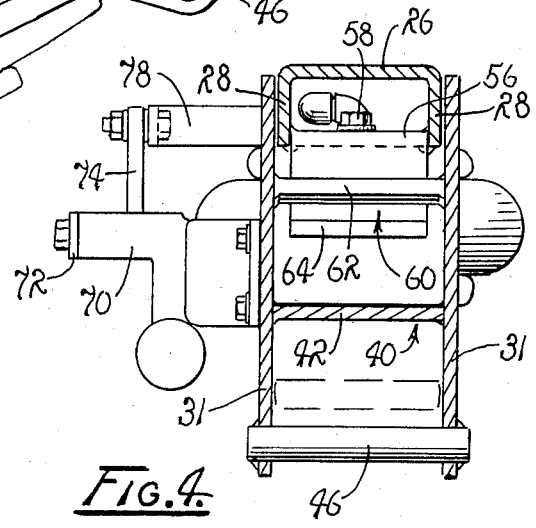

AIR SPRING UNIT FOR SUSPENSION SYSTEMS

BACKGROUND OF THE INVENTION

The invention generally relates to suspension systems, and more particularly to an improved air spring unit for use with a spring suspension system of a type currently provided for highway vehicles, such as trailers and the like.

Heretofore, it has been common practice to provide trailers and similar vehicles with suspension systems having coil springs and/or leaf springs. Such systems are interposed between the load-bearing axles and the frames of the vehicles for dissipating applied shock loads. Unfortunately, designers of the suspension system have long been plagued with the perplexing problem of providing a suspension system having a capability of properly supporting a vehicle in its unloaded condition as well as its loaded condition.

As is readily recognized by those familiar with the design of suspension systems for highway vehicles, a suspension system should be capable of supporting an equipped vehicle in its loaded condition. To achieve this, it is common practice to provide massive springs interposed between the load-bearing axle and the frame of the vehicle. While it is readily apparent that springs of sufficient rigidity can be provided for supporting a vehicle in its loaded condition, simply by increasing the mass thereof, a perplexing problem arises when the same vehicle must be employed in its unloaded or empty condition.

For example, it is not unusual for a trailer, such as a flat-bed or the like, to be employed in delivering a load to a given destination and thereafter be returned in an empty condition. Of course, where the springs employed are sufficiently rigid for supporting a trailer as it is transported in its loaded condition, the springs often lack sufficient resiliency for dissipating shock loads when the trailer is transported in its unloaded condition. Consequently, highway vehicles often are subjected to the destructive effects of shock loads as they are transported in an unloaded condition.

Attempts have been made to solve this and similar problems employing various techniques. Moreover, a use of air bags in combination with leaf springs has heretofore been proposed. Such suspension systems are typified by the system disclosed in U.S. letters Pat. No. 3,309,107 which issued Mar. 14, 1967 to George Chieger of Birmingham, Mich.

While these systems have met generally with varying degrees of success they have not provided a satisfactory solution to problems continuously challenging designers of suspension systems. Moreover, a designer of suspension systems also must continuously cope with the perplexing problem of reducing mass while achieving increased efficiency. Moreover, designers of such systems have not provided suitable units which can be incorporated in existing suspension systems for imparting air-ride characteristics to spring-type suspension systems.

It is therefore the general purpose of the instant invention to provide an improved, economic, and efficient air spring unit, particularly suited for inclusion in an existing suspension system of a type having leaf springs mounted on load-bearing axles for supporting highway vehicles, such as trailers and the like.

OBJECTS AND SUMMARY OF THE INVENTION

It is therefore an object of the instant invention to provide an improved air spring unit for use in a suspension system for a highway vehicle.

It is another object to provide an improved air spring unit in combination with suspension systems of the type including leaf springs and the like.

It is another object to provide an improved air spring unit which can readily be incorporated in a leaf-spring suspension system for imparting to the system an "empty-ride" capability.

It is another object to provide a practical and economic suspension system for a highway vehicle, such as a trailer or the like, having a capability of supporting the vehicle in its loaded condition, with suitable rigidity, while having a capability for supporting the vehicle in its unloaded condition, with suitable resiliency for dissipating highway induced shock.

These and other objects and advantages are achieved through the use of a simple and economic unit, which includes a mounting bracket for coupling the unit to the frame of a selected vehicle, force dissipating means suspended from the bracket and interposed between a leaf spring and the frame of the vehicle including an arm connected with the bracket and supported for pivotal oscillation about an axis extended through one end thereof, a pressurizable air bag interposed between the frame and the arm in spaced relation with the axis and a force transfer plate affixed to the arm and adapted to rest on the distal end of a projected leaf of a leaf-spring assembly for transferring shock loads to the air bag as the leaf-spring assembly is subjected to highway induced shock loading, as will hereinafter become more readily apparent by reference to the following description and claims in light of the accompanying drawings.

BRIEF DESCRIPTION OF THE DRAWINGS

FIG. 1 is an elevational view of a suspension system including therein an air spring unit embodying the principles of the instant invention.

FIG. 2 is a top plan view of the suspension system shown in FIG. 1.

FIG. 3 is a sectioned elevational view, of the air spring unit shown in FIGS. 1 and 2.

FIG. 4 is a sectional end view, taken generally along line 4—4 of FIG. 2.

FIG. 5 is a fragmented, perspective view of a load-leveling valve provided for the air spring unit.

FIG. 6 is a schematic view of a pneumatic system provided for the air spring unit.

DESCRIPTION OF THE PREFERRED EMBODIMENT

Referring now to the drawings wherein like reference characters designate like or corresponding parts throughout the several views, there is shown in FIG. 1 a leaf-spring suspension system, generally designated 10, equipped with an air spring unit, generally designated 11. The suspension system 10 is suited for use with highway vehicles of various types, including trailers and the like, not shown. It is, of course, to be understood that the suspension unit 10 is interposed between a load-bearing axle 12 and a longitudinal frame member 14. Since the highway vehicle with which the air spring unit is employed forms no specific part of the instant invention, a detailed description thereof is omitted in the interest of brevity. However, it should be appreciated that the longitudinal member 14 is typified by frame members found within the chassis of highway vehicles including both partial and full trailers. Therefore, the air spring unit 11 may be included within the chassis of a wheeled unit, or affixed directly to the frame of the vehicle.

As illustrated in the drawings, the suspension system 10 is of a type which includes a leaf-spring assembly 16. This assembly is connected with the member 14 by a hanger 18, and supportingly engages the air spring unit 11. The leaf-spring assembly 16 includes multiple leaf spring members 22 which project in a cantilevered fashion from the load-bearing axle 12, and is connected therewith through a suitable coupling, generally designated 24. Since the coupling 24 forms no part of the instant invention, a detailed description thereof is omitted. However, it is to be understood that the coupling 24 serves to secure the leaf-spring assembly 16 in place relative to the axle 12.

The air spring unit 11, as shown, includes a mounting bracket 26. This bracket, in practice, is welded or otherwise rigidly secured to the lowermost surface of the longitudinal member 14, preferably in the position conventionally occupied by a rear spring hanger. As a practical matter, the air spring unit 11 is particularly suited to be employed in lieu of a rear spring hanger, once the hanger has been removed from the member 14.

As shown in FIG. 4, the bracket 26 is of an inverted U-shaped cross-sectional configuration. Thus the bracket includes a pair of vertically oriented, mutually spaced plates 28. The plates 28, in turn, include a pair of depending ears 29, FIG. 3, from which is suspended a force dissipating arm 30. The arm 30 also includes a pair of side plates 31 pinned to the bracket 26 at a knuckle assembly generally designated 32. The knuckle assembly 32 is of any suitable design. As shown, the knuckle assembly includes, where so desired, a transverse sleeve 34 extended through a pair of openings, not designated, provided in the ears 29 and welded to the side plates 31. With the sleeve 34 there is disposed a bushing 36 through which extends a concentrically related coupling pin 38. The coupling pin 38 is, where so desired, provided in the form of a screw-threaded bolt having a head and a thread portion for receiving a nut, not designated. Suitable washers, also not designated, are employed in a manner well understood by those familiar with the design and fabrication of suspension systems.

Extending between the side plates 31 there is an elongated force transfer plate, generally designated 40. The plate 40 generally is of a length substantially coincident with the length of the side plates 31 and is connected therewith in a suitable manner, such as by welding and the like.

In practice, the plate 40 includes a distal portion 42 extending from an arcuate base portion 44. The arcuate base portion serves as a wear plate for slidingly engaging the uppermost leaf spring member 22 of the leaf-spring assembly 16. It is to be understood that a substantial portion of the weight of the vehicle is transferred from the longitudinal member 14 to the leaf-spring assembly 16 along a load transfer zone, defined by the zone of engagement between the base plate 44 and the leaf spring member 22. As a practical matter, a rebound bar 46 also is extended between the plates 31, beneath the uppermost leaf spring member 22, and serves as a retainer for maintaining component alignment in the event rebound in vertical directions is experienced.

It is, for the sake of simplifying the description of the instant invention, to be understood that the uppermost leaf spring 22 serves as a force transfer member for applying upwardly directed reactive forces to the force transfer plate 44, and that this force, in turn, has a propensity to impart pivotal motion to the force transfer arm 30. Of course, as a vehicle equipped with the suspension system 10 is caused to travel along a given highway, the reactive force is applied intermittently with a varying magnitude. This force, when coupled with the rebound effect imparted by energy stored in leaf springs 22, serves to apply oscillatory motion to the force dissipating arm 30 of a varying magnitude.

In order to dissipate the force thus applied to the force dissipating arm 30, there is provided an air bag assembly 50. This assembly is interposed between the distal end of the force dissipating arm 30 and the bracket 26 and includes a single-convolute air bag 51, of a suitable, commercially available design. It is to be understood that, where desired, and sufficient space is available, a double-convolute air bag may be employed equally as well.

The air bag 51, as shown, is sandwiched between a base plate 52 and a cover plate 53. The base plate 52 is secured to the distal end portion 42 of the force transfer plate 40, by screws 54, while the cover plate 53 is secured to the bracket 26. As a practical matter, the bracket 26 also includes a hanger plate 56 extended between the side plates 28 and welded thereto. A plurality of suitable screws 58 seated in screw-threaded openings, not designated, provided in the cover plate 53 are employed for securing the cover plate 53 to the bracket 26.

It should be apparent that the air bag 51 acts in compression to dissipate force, by converting energy as reactive force is applied to the force transfer plate 40. Thus the throw of the force dissipating arm 30, in an upward direction, is dictated by pressures developed within the air bag 51. In order to limit the throw of the arm 30 in a downward direction, as viewed in FIGS. 1 and 3, a positive stop 60 is provided. The stop 60 includes a transverse bar 62 extended between the side plates 31 of the force dissipating arm 30, and rigidly affixed thereto, while a lip 64 depends from the hanger plate 56 and is positioned to engage the bar 62 as excessive downward displacement is imparted to the force dissipating arm 30.

As should readily be apparent, the normal position of the force dissipating arm 30, relative to the bracket 26 is dictated by the pressure established within the air bag 51 and the force applied by the leaf-spring assembly 16 via the force transfer plate 40. Therefore, the air bag 51 preferably is connected with a source of air 66, FIG. 6, through a flexible pressure line 68. The source 66, in practice, is the source of system air normally found aboard highway vehicles. Of course, other sources can be employed equally as well.

Within the pressure line 68, between the source of air 66 and the air bag 51, there is connected a leveling valve, generally designated 70. Since leveling valves are well known in the art, a detailed description of the valve 70 is omitted in the interest of brevity. However, it is to be understood that the valve 70 is mounted on a side plate 31 of the force dissipating arm. This valve includes a lever arm 72 connected with a valve actuator in a manner such that as the arm 72 of the valve is moved upwardly, through a predetermined throw, the pressure line 68 is opened to atmosphere, at the air bag side of the valve and, of course, as the arm 72 is moved downwardly, through a predetermined throw, the bag 51 is caused to communicate, through the valve, with the source of air 66. Hence, in the event the bag 51 is expanded upwardly through a predetermined distance, the valve 70 is actuated for releasing the pressure from the bag 51 and in the event the bag 51 is compressed, through a predetermined distance, the bag is further pressurized through an introduction of air via the line 68.

In order to achieve an actuation of the lever arm 72 there is provided a link 74 which is pivotally connected with the distal end of the lever arm 72 and pinned to a suitable bracket 78 rigidly mounted on the adjacent side plate 28 of the bracket 26.

OPERATION

It is believed that in view of the foregoing description, the operation of the device will readily be understood and it will be briefly reviewed at this point.

In practice, the air spring unit 11 is fabricated into an integrated unit and is supplied at a point of assembly for inclusion in a selected suspension system. Where the air spring unit 11 is to be incorporated in an existing suspension system, the rearmost hanger is removed from the longitudinal member 14 and the bracket 26 welded in its place and in lieu thereof.

However, where a new suspension assembly is being fabricated, it is only necessary to seat and secure the air spring unit 11 in place. When finally assembled as hereinbefore described, the resulting suspension system is of a hybrid configuration, including both the leaf-spring assembly 16, and the air spring unit 11, while the uppermost leaf-spring 22 serves as a force transfer member in sliding engagement with the force transfer plate 40. As should readily be apparent from a cursory review of FIGS. 1 and 3, downwardly directed flexural motion imparted to the leaf-spring unit 16 causes the surface of the uppermost leaf-spring 22 to slide in a given direction relative to the surface of the wear plate, aforementioned. Similarly, upwardly directed pivotal motion imparted to the arm 30 causes the surface of the wear plate to slide relative to the surface of the uppermost leaf-spring 22, in a direction opposite to that in which the surface of the leaf-spring is caused to slide in response to the aforementioned flexural motion. Since sliding engagement is accommodated between the adjacent surfaces of the leaf-spring 22 and the wear plate 40, the leaf-spring 22 can readily slide along the surface of the wear plate without experiencing a binding effect between the leafs, which so often attends a use of a leaf-spring suspension system. Hence, the shock absorbing effects of the suspension system of the instant invention can be appreciated without requiring a "breaking" of the binding effects.

As a thus equipped vehicle is caused to travel along the surface of a selected highway, a non-uniform flexing of the leaf-springs 22 of the assembly 16 is experienced, and thus a reactive force of a continuously varying magnitude is applied to the force transfer plate 40. This force serves to impart non-uniform oscillatory motion to the force dissipating arm 30. As the arm 30 is thus caused to move upwardly, as viewed in FIGS. 1 and 3, the air bag 51 is compressed for dissipating the applied force. In the event rebound is experienced, the bag is caused to extend downwardly as the rebound bar 46 engages the lowermost surface of the upper leaf-spring 22, however, excessive downward motion is limited by the stop 60.

Pressurization of the air bag 51 is controlled by the leveling valve 70, which serves to pressurize the air bag 51 in accordance with the weight load applied to the vehicle. For example, in the event the load is sufficiently heavy for compressing the bag 51, the valve 70 is actuated for further pressurizing the bag and thus causing it to expand and assume a larger vertical dimension. In the event a load is removed from the vehicle and the bag 51 becomes over-expanded, the valve 70 is actuated for reducing the pressure within the air bag. Of course, the stop 60 becomes effective for limiting downward motion of the arm 30 and thus limits expansion of the air bag 51. Since the vertical dimensions of the air bag 51 are thus caused to remain substantially constant, due to the collective and combined effects of the leveling valve 70 and the stop 60, the distance between the air bag 51 and the point at which the surface of the spring 22 engages the aformentioned wear plate remains substantially fixed, regardless of the weight load imposed on the vehicle. Therefore, as should be apparent, the air bag 51 is continuously caused to support the arm 30 against pivotal motion, about the coupling 38, through a moment arm of a substantially fixed length. Consequently, the air bag 51 functions in a uniform manner for uniformly dissipating the force applied via the force dissipating arm without regard to the magnitude of weight load supported by the suspension system 10.

In view of the foregoing, it should readily be apparent that the suspension system of the instant invention provides a practical solution to the perplexing problem of providing a suspension system which has a capability of supporting a highway vehicle in a loaded condition and a capability of providing a soft, empty-ride when the vehicle is in an unloaded condition.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. In combination with a suspension system for a vehicle of a type including a load-supporting axle and a leaf-spring assembly extended transversely of said axle and mounted thereon in a load-supporting relation with the frame of the vehicle, an improved air spring unit comprising:
   A. means including a bracket suspended from said frame;
   B. a force dissipating arm of an elongated configuration;
   C. coupling means supporting said arm for pivotal motion in a vertical plane, including a horizontally extended pivot pin for pivotally connecting one end of said arm to said bracket in a coplanar relationship therewith;

D. a variably pressurized air bag interposed between said arm and said bracket and connected with said arm at the end thereof opposite said one end;

E. means for maintaining the height dimension of said air bag substantially constant, including an operable leveling valve connected with said air bag for varying the pressure within the air bag as predetermined pivotal motion in opposite directions is imparted to the force dissipating arm, and motion limiting means including a motion limiting stop for arresting pivotal motion of said force dissipating arm in at least one direction; and F. means for causing the air bag to support said arm in a substantially uniform manner against rotation about said pivot pin through a moment arm of a substantially fixed length including a wear plate defined on said arm in juxtaposition with said one end of the arm and in spaced relation with the end thereof opposite said one end, said wear plate being continuously seated on said leaf-spring assembly with the juxtaposed surfaces of the wear plate and the leaf-spring assembly being mated in a slidable relationship.

* * * * *